(12) United States Patent
Berk et al.

(10) Patent No.: US 11,567,622 B2
(45) Date of Patent: Jan. 31, 2023

(54) NAVIGATION APPLICATION WITH NOVEL DECLUTTER MODE

(71) Applicant: Apple Inc., Cupertino, CA (US)

(72) Inventors: Jonathan L. Berk, Mountain View, CA (US); Bradley L. Spare, Oceanside, CA (US); Edward J. Cooper, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 16/866,849

(22) Filed: May 5, 2020

(65) Prior Publication Data

US 2020/0264735 A1 Aug. 20, 2020

Related U.S. Application Data

(63) Continuation of application No. 15/975,519, filed on May 9, 2018, now Pat. No. 10,678,395, which is a (Continued)

(51) Int. Cl.
*G06F 3/0481* (2022.01)
*G01C 21/36* (2006.01)
(Continued)

(52) U.S. Cl.
CPC ....... *G06F 3/0481* (2013.01); *G01C 21/3638* (2013.01); *G01C 21/3667* (2013.01);
(Continued)

(58) Field of Classification Search
USPC ...................................................... 701/432
See application file for complete search history.

(56) References Cited

U.S. PATENT DOCUMENTS

| 5,848,373 A | 12/1998 | Delorme et al. |
| 6,374,182 B2 | 4/2002 | Bechtolsheim et al. |

(Continued)

FOREIGN PATENT DOCUMENTS

| CN | 101344836 A | 1/2009 |
| CN | 101903747 A | 12/2010 |

(Continued)

*Primary Examiner* — Tyler D Paige
(74) *Attorney, Agent, or Firm* — Invoke

(57) ABSTRACT

Some embodiments provide a navigation application with a novel declutter navigation mode. In some embodiments, the navigation application has a declutter control that when selected, directs the navigation application to simplify a navigation presentation by removing or de-emphasizing non-essential items that are displayed in the navigation presentation. In some embodiments, the declutter control is a mode-selecting control that allows the navigation presentation to toggle between normal first navigation presentation and a simplified second navigation presentation, which below is also referred to as a decluttered navigation presentation. During normal mode operation, the navigation presentation of some embodiments provides (1) a representation of the navigated route, (2) representations of the roads along the navigated route, (3) representation of major and minor roads that intersect or are near the navigated route, and (4) representations of buildings and other objects in the navigated scene. However, in the declutter mode, the navigation presentation of some embodiments provides a representation of the navigated route, while providing a de-emphasized presentation of the roads that intersect the navigated route or are near the navigated route. In some embodiments, the presentation shows the major roads that are not on the route with more emphasis than minor roads not on the route. Also, in some embodiments, the presentation fades out the minor roads not on the route more quickly than fading out the major roads not on the route.

21 Claims, 10 Drawing Sheets

Related U.S. Application Data continuation of application No. 15/093,738, filed on Apr. 8, 2016, now Pat. No. 9,971,470.

(60) Provisional application No. 62/235,519, filed on Sep. 30, 2015.

(51) Int. Cl.
*G06F 3/04842* (2022.01)
*G06T 13/20* (2011.01)
*G06T 15/20* (2011.01)
*G06T 19/00* (2011.01)

(52) U.S. Cl.
CPC .......... *G06F 3/04842* (2013.01); *G06T 13/20* (2013.01); *G06T 15/20* (2013.01); *G06T 19/003* (2013.01)

(56) References Cited

U.S. PATENT DOCUMENTS

| | | | |
|---|---|---|---|
| 7,640,098 B2 | 12/2009 | Stenbock et al. | |
| 7,818,122 B2 | 10/2010 | Tobiyama et al. | |
| 8,463,542 B2 | 6/2013 | Pfeiffer et al. | |
| 8,781,736 B2 | 7/2014 | Cera et al. | |
| 9,971,470 B2 | 5/2018 | Cooper et al. | |
| 2003/0231190 A1 | 12/2003 | Jawerth et al. | |
| 2005/0022462 A1 | 2/2005 | Crandell | |
| 2005/0052462 A1 | 3/2005 | Sakamoto et al. | |
| 2008/0243367 A1 | 10/2008 | Wako | |
| 2009/0019369 A1 | 1/2009 | Borovsky et al. | |
| 2009/0132161 A1 | 5/2009 | Akita et al. | |
| 2011/0063301 A1 | 3/2011 | Setlur et al. | |
| 2011/0087425 A1* | 4/2011 | Deng | G01C 21/32 701/532 |
| 2011/0161815 A1 | 6/2011 | Iwahara | |
| 2011/0161875 A1* | 6/2011 | Kankainen | G06F 3/0481 715/810 |
| 2012/0041674 A1* | 2/2012 | Katzer | G01C 21/3658 701/461 |
| 2013/0321431 A1 | 12/2013 | Chen et al. | |
| 2013/0322665 A1 | 12/2013 | Bennett et al. | |
| 2014/0019036 A1 | 1/2014 | Lemay et al. | |
| 2014/0063044 A1 | 3/2014 | Kim | |
| 2014/0268353 A1 | 9/2014 | Fujimura et al. | |
| 2014/0288820 A1* | 9/2014 | Opshaug | G01C 21/30 701/469 |
| 2014/0365113 A1 | 12/2014 | Mcgavran et al. | |
| 2015/0213642 A1 | 7/2015 | Tange et al. | |
| 2015/0365299 A1 | 12/2015 | Schaerges et al. | |
| 2016/0092081 A1 | 3/2016 | Reichle | |
| 2017/0090682 A1* | 3/2017 | Cooper | G06T 13/20 |
| 2022/0090919 A1* | 3/2022 | Zhang | G01C 21/3667 |

FOREIGN PATENT DOCUMENTS

| | | |
|---|---|---|
| CN | 101968365 A | 2/2011 |
| CN | 104335008 A | 2/2015 |
| CN | 104335268 A | 2/2015 |
| CN | 104471616 A | 3/2015 |
| CN | 104515531 A | 4/2015 |
| EP | 1508780 A1 | 2/2005 |
| EP | 2672230 A1 | 12/2013 |
| EP | 2879096 A1 | 6/2015 |
| WO | 2009/080074 A1 | 7/2009 |
| WO | 2017/058449 A1 | 4/2017 |

\* cited by examiner

NAVIGATION APPLICATION WITH NOVEL DECLUTTER MODE

INCORPORATION BY REFERENCE; DISCLAIMER

Each of the following applications are hereby incorporated by reference: application Ser. No. 15/975,519 filed on May 9, 2018; application Ser. No. 15/093,738 filed on Apr. 8, 2016; application No. 62/235,519 filed on Sep. 30, 2015. The Applicant hereby rescinds any disclaimer of claim scope in the parent application(s) or the prosecution history thereof and advises the USPTO that the claims in this application may be broader than any claim in the parent application(s).

BACKGROUND

With proliferation of mobile devices such as smartphones, users are enjoying numerous applications of numerous kinds that can run on their devices. One popular type of such applications are mapping and navigation applications that allow users to browse maps and get route directions. Despite their popularity, these mapping and navigation applications have shortcomings with their features that cause inconvenience to the users.

BRIEF SUMMARY

Some embodiments provide a navigation application with a novel declutter navigation mode. In some embodiments, the navigation application has a declutter control that when selected, directs the navigation application to simplify a navigation presentation by removing or de-emphasizing non-essential items that are displayed in the navigation presentation. In some embodiments, the declutter control is a mode-selecting control that allows the navigation presentation to toggle between normal first navigation presentation and a simplified second navigation presentation, which below is also referred to as a decluttered navigation presentation. In some embodiments, both the first and second navigation presentations are two-dimensional (2D) presentations. Also, in some embodiments, both the first and second navigation presentations are three-dimensional (3D) presentations. In still other embodiments, both presentations can change freely between 2D and 3D views of the navigated scene.

During normal mode operation, the navigation presentation of some embodiments provides (1) a representation of the navigated route, (2) representations of the roads along the navigated route, (3) representation of major and minor roads that intersect or are near the navigated route, and (4) representations of buildings and other objects in the navigated scene. However, in the declutter mode, the navigation presentation in some embodiments provides a representation of the navigated route, while providing a de-emphasized presentation of the roads that intersect the navigated route or are near the navigated route. In some embodiments, the presentation shows the major roads that are not on the route with more emphasis than minor roads not on the route. Also, in some embodiments, the presentation fades out the minor roads not on the route more quickly than fading out the major roads not on the route.

Given that the presentation de-emphasizes roads not on the route, the presentation in some embodiment represents the navigated route by simply displaying the roads on the navigated route with more emphasis (e.g., by displaying the roads traversed by the navigated route in brighter, bolder or different colors). In other words, in these embodiments, the presentation does not provide a separate representation of the navigated route, as such a representation is not necessary in view of the emphasized presentation of the roads on the navigated route and the de-emphasized presentation of the roads that are not on the navigated route. Since a representation is not provided for the navigated route, the navigation presentation in some embodiments uses colors and/or draws arrows on the roads traversed by the navigated route to identify upcoming maneuvers on the navigated route.

In some embodiments, the decluttered navigation presentation includes fewer superfluous objects in the navigated scene. However, in some of these embodiments, the decluttered presentation still displays significant landmarks (e.g., points of interests, such as buildings, gas stations, geographic landmarks (hills, etc.)). In fact, in some embodiments, the decluttered presentation provides maneuver instructions in terms of upcoming landmarks (e.g., "turn left at the Shell station"). In some embodiments, the landmarks are identified in an automated manner by analyzing POI designations in the map data, and analyzing building footprint data to identify the size of the buildings. Also, in some embodiments, the navigation presentation has a night-time decluttered mode that presents night-time views of the buildings in the navigated route.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
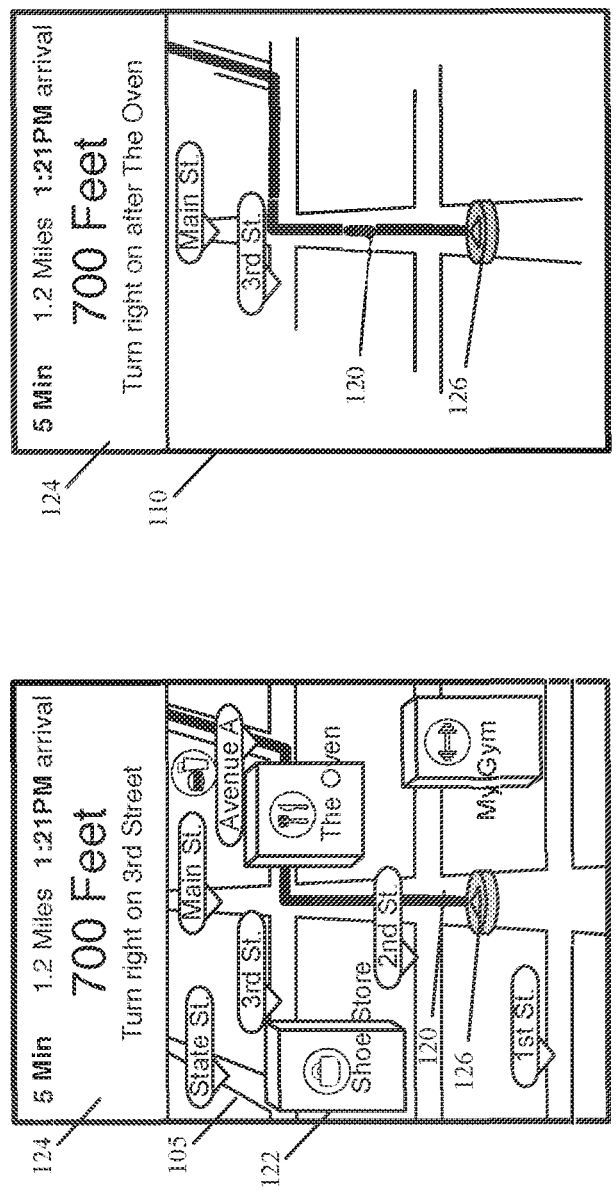
FIG. 1 illustrates an example of the two different type navigation presentations that the navigation application of some embodiments can provide during these two modes.

Some embodiments provide a navigation application with two different navigation modes, a regular navigation mode and a declutter navigation mode, that provide two different navigation presentations for providing navigation instructions to a particular destination. FIG. 1 illustrates an example of the two different type navigation presentations 105 and 110 that the navigation application of some embodiments can provide during these two modes. Both of these presentations display the same section of a navigated route to a destination as rendered from the same perspective in the rendered 3D map scene (e.g., as rendered from the same position, in a 3D map coordinate system, of a virtual camera that is used to define the rendered 3D map scene).

The first navigation presentation 105 is a typical 3D navigation presentation that includes (1) a representation 120 of the navigated route, (2) a representation 126 of the navigated device, (3) representations of the roads traversed by the navigated route, (4) representation of major and minor roads that intersect or are near the navigated route (i.e., that intersect or are near the roads traversed by the navigated route), (5) representations of buildings 122 and other objects in the navigated scene, and (6) navigation banners 124 that provide navigation instructions. The second decluttered navigation presentation 110 is a simplified navigation presentation that includes far less object representations. In the example illustrated in FIG. 1, like the first navigation presentation 105, the simplified second presentation 110 includes (1) a representation 120 of the navigated route, (2) a representation 126 of the navigated device, and (3) navigation banners 124 with navigation instructions.

However, in this example, the second navigation presentation 110 de-emphasizes the roads that intersect the navigated route or are near the navigated route. In some embodiments, the decluttered presentation 110 shows the major roads that are not on the route with more emphasis than minor roads not on the route. Also, in some embodiments, the decluttered presentation 110 fades out the minor roads not on the route more quickly than fading out the major roads not on the route. While the example of FIG. 1 illustrates detailed and decluttered 3D navigation presentations, one of ordinary skill will realize that in some embodiments the navigation application can provide conjunctively or alternatively 2D navigation presentations (top-down navigation presentations) that can be either detailed 2D navigation presentations or decluttered 2D navigations presentations.

Given that the presentation de-emphasizes roads not on the route, the simplified navigation presentation in some embodiment represents the navigated route by simply displaying the roads on the navigated route with more emphasis (e.g., by displaying the roads traversed by the navigated route in brighter, bolder or different colors). In other words, in these embodiments, the presentation does not provide a separate representation of the navigated route, as such a representation is not necessary in view of the emphasized presentation of the roads on the navigated route and the de-emphasized presentation of the roads that are not on the navigated route. Since a representation is not provided for the navigated route, the navigation presentation in some embodiments uses colors and/or draws arrows on the roads traversed by the navigated route to identify upcoming maneuvers on the navigated route. These embodiments will be further described below.

In some embodiments, the decluttered navigation presentation includes fewer superfluous objects in the navigated scene. However, in some of these embodiments, the decluttered presentation still displays significant landmarks (e.g., points of interests, such as buildings, gas stations, geographic landmarks (hills, etc.)). In fact, in some embodiments, the decluttered presentation provides maneuver instructions in terms of upcoming landmarks (e.g., "turn left at the Shell station"). In some embodiments, the landmarks are identified in an automated manner by analyzing POI designations in the map data, and analyzing building footprint data to identify the size of the buildings. Also, in some embodiments, the navigation presentation has a night-time decluttered mode that presents night-time views of the buildings in the navigated route. These embodiments will be further described below.

In the example illustrated in FIG. 1, both the first and second navigation presentations are three dimensional (3D) presentations. In other cases, both the first and second navigation presentations are two dimensional (2D) presentations. Also, in still other embodiments, both presentations can change freely between 2D and 3D views of the navigated scene.

Figure 2:
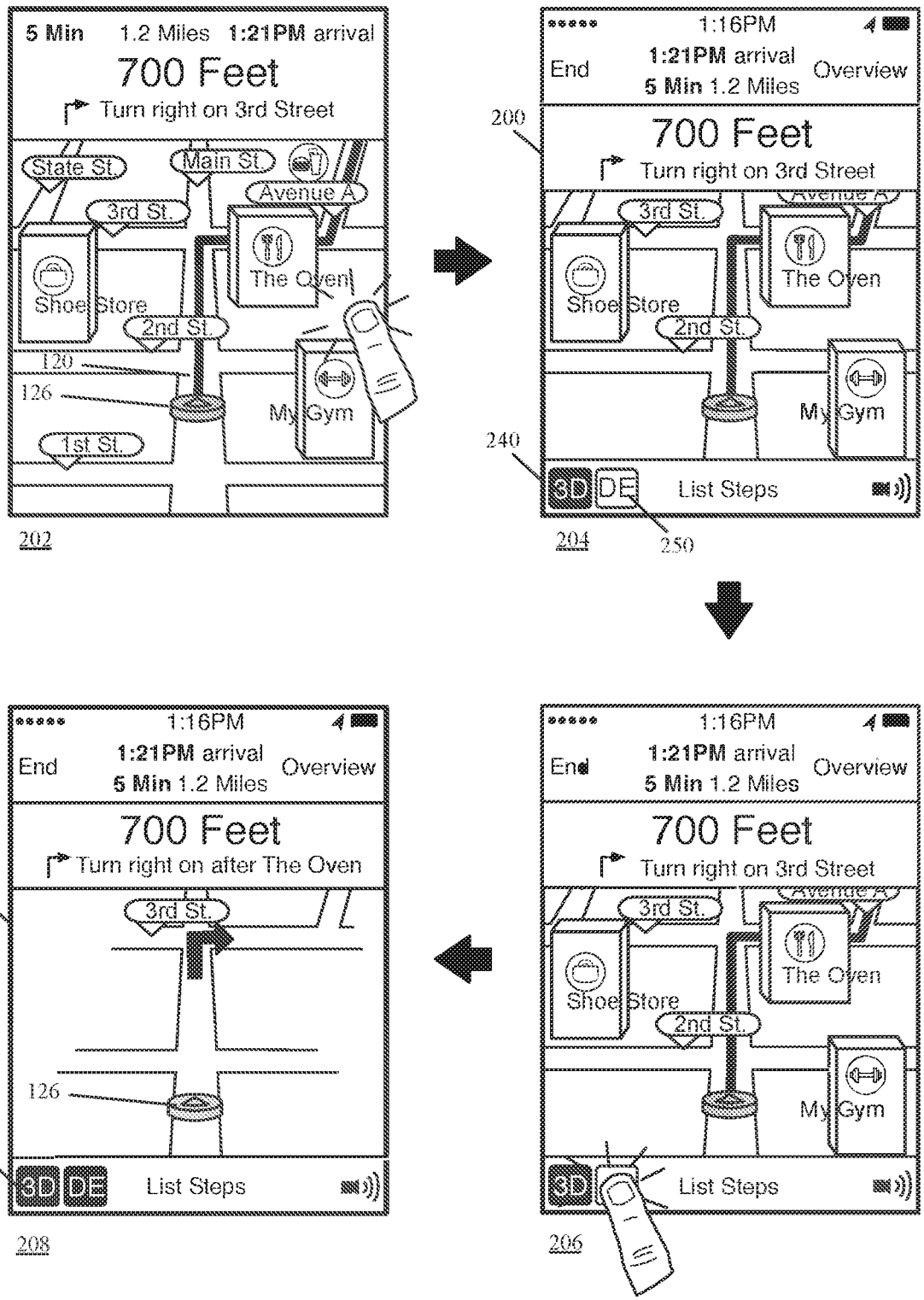
FIG. 2 illustrates an example of a navigation application user interface (UI) that includes such a declutter control.

In some embodiments, the navigation application has a declutter control that when selected, directs the navigation application to simplify a navigation presentation by removing or de-emphasizing non-essential items that are displayed in the navigation presentation. In some embodiments, the declutter control is a mode-selecting control that allows the navigation presentation to toggle between normal navigation presentation and declutter navigation presentation. FIG. 2 illustrates an example of a navigation application user interface (UI) 200 that includes such a declutter control. This example is illustrated in terms of four operational stages of the UI 200. In this example, the navigation application executes on a mobile device with a touch-sensitive display screen.

In the first stage 202, the UI provides a first 3D navigation presentation during a first navigation mode. This is a traditional navigation presentation that provides (1) a representation of the navigated route, (2) representations of the roads along the navigated route, (3) representation of major and minor roads that intersect or are near the navigated route, (4) representations of buildings and other objects in the navigated scene, and (5) navigation banners to provide navigation instructions. The first stage 202 also shows the user selecting the navigation presentation by touching the display screen of the mobile device where it displays this presentation.

The second stage 204 shows the UI displaying several UI controls relating to the navigation presentation. The navigation application presents this additional UI controls in response to the user's selection of the navigation presentation. One of these controls is a 3D control 240 that the user can select to toggle between a 2D navigated map view and a 3D navigated map view. In some embodiments, the user can toggle between these two views in either the traditional navigation presentation mode or the decluttered navigation presentation mode. The second stage 204 shows the 3D control 240 highlighted in order to convey that the current navigation presentation is being displayed with a 3D map view.

Another control that is presented in the second stage is the declutter control 250. The third stage 206 shows the user selecting the declutter control 250. In response, the navigation application presents the decluttered navigation presentation 275, which is illustrated in the fourth stage 208. As in the example illustrated in FIG. 1, the de-cluttered navigation presentation 275 displays navigation banners with navigation instructions and emphasized representations of the navigated roads, while not displaying buildings in the displayed navigation scene and de-emphasizing the representations of the roads that intersect the navigated route or are near the navigated route. In some embodiments, the navigation application emphasizes the representations of the navigated roads during the de-cluttered navigation presentation by using different colors, brighter lines (e.g., more color saturated lines) and/or thicker lines to represent these roads, while using other colors, dimmer lines (e.g., less color saturated lines) and/or thinner lines to represent the roads that intersect the navigated route or are near the navigated route. In some embodiments, the presentation shows the major roads that are not on the route with more emphasis than minor roads not on the route. Also, in some embodiments, the presentation fades out the minor roads not on the route more quickly than fading out the major roads not on the route.

Unlike the example illustrated in FIG. 1, the de-cluttered navigation presentation 275 does not provide a separate representation 120 of the navigated route, as such a representation is not necessary in view of the emphasized representation of the roads on the navigated route and the de-emphasized representation of the roads that are not on the navigated route. In other words, this presentation 275 represents the navigated route by simply displaying the roads on the navigated route with more emphasis because this presentation de-emphasizes roads not on the route. The fourth stage 208 also displays the 3D control 240 as highlighted to signify that the decluttered presentation is a 3D presentation. Selection of this control would direct the navigation application to display a 2D view of the decluttered navigation presentation.

Figure 3:
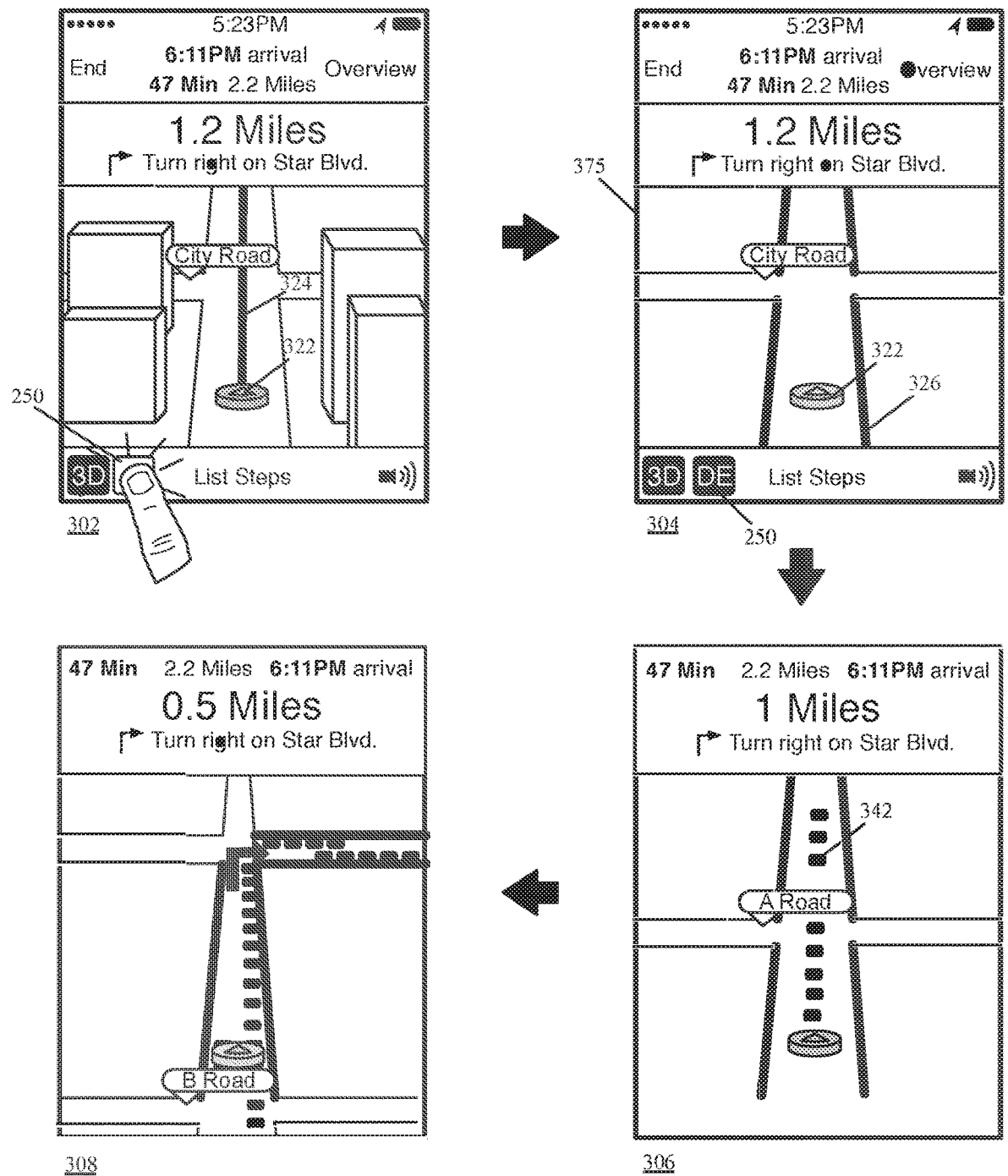
FIG. 3 illustrates an example of highlighting traffic conditions in place of providing route representation in a navigation presentation.

When a representation is not provided for the navigated route in the decluttered navigation mode, the navigation presentation in some embodiments uses colors and/or draws objects (e.g., arrows, icons, etc.) on the roads traversed by the navigated route to identify upcoming maneuvers on the navigated route and to highlight traffic conditions along the navigated route. FIG. 3 illustrates an example of highlighting traffic conditions in place of providing route representation in a navigation presentation. This example is illustrated in four operational stages 302-308. The first stage 302 shows a traditional 3D navigation presentation showing a representation 322 of the device navigating along a represented route 324. This stage also shows the user selecting the declutter control 250.

The second stage 304 shows that the application displays a decluttered navigation presentation 375 in response to this selection. This decluttered presentation 375 is like the decluttered navigation presentation 275 in that it does not display the representation 324 of the navigated route nor does it display representations of buildings in the displayed navigation scene. Instead, the decluttered presentation 375 has a more pronounced representation of the roads 326 traversed by the navigated route, while (1) not providing representations of the roads that neither are on the navigated route nor do they intersect a road traversed by the navigated route and (2) providing less pronounced representations of the roads that intersect the roads traversed by the navigated route. In some embodiments, the roads on the navigated route can be drawn with stronger colors, more saturated colors, bolder lines, thicker lines, or highlighted, in order to differentiate them from other roads that are drawn in the decluttered navigation presentation.

The third stage 306 shows that in place of the navigated-route representation, the decluttered navigation presentation displays traffic indication markers 342 along the road 326 traversed by the navigated route, in order to highlight traffic congestion along the route. In this example, the traffic congestion markers are displayed as dashed line segments. Other embodiments use other representations, such as solid lines, etc. The fourth stage 308 illustrates that the traffic indication markers can also be shown on roads farther ahead on the navigated route, in order to highlight traffic farther ahead. In this example, the upcoming road with traffic is a road on which the user has to make a turn. Also, in this stage, traffic conditions are displayed on both travel directions on the upcoming road. By providing this traffic information during the navigation presentation in such a clear format, the decluttered navigation presentation allows the user to easily view such conditions, and if need be, to change the navigated route to avoid traffic congestion.

In the example of FIG. 3, the traffic condition that is illustrated is traffic congestion. Some embodiments use the extra space that is created by removing the navigated-route representation to display other traffic congestion indicators on the road or adjacent to the road representation. Examples of such indicators include indicators for objects on the road, construction on the road, accidents along the road, etc.

The navigation application of some embodiments has a style-sheet driven rendering engine that generates navigation presentations based on one or more style sheets. In some of these embodiments, the rendering engine uses one set of style sheets to generate the regular navigation presentation in either the 2D or 3D views, while using another set of style sheets to generate the decluttered navigation presentation.

Figure 4:
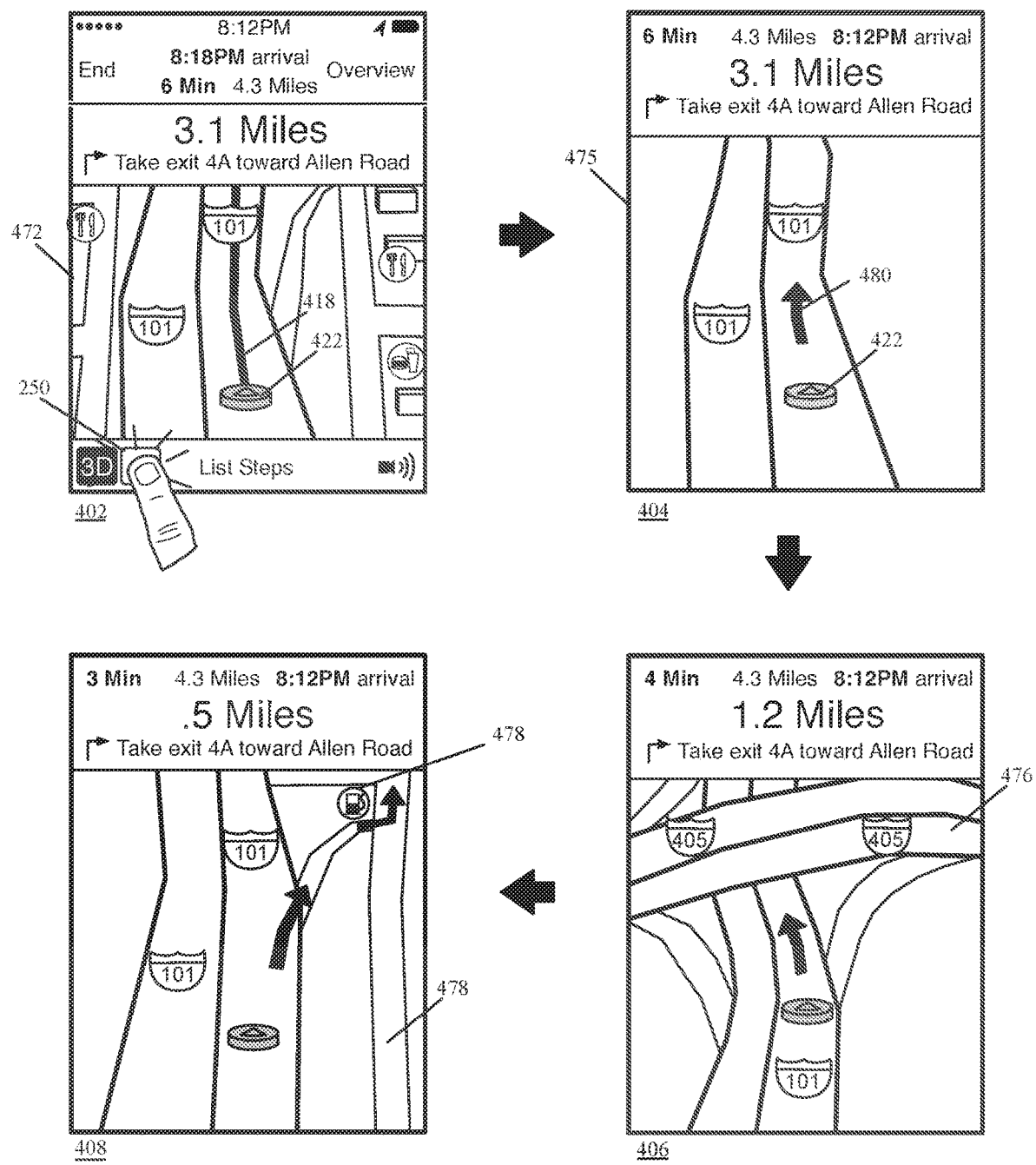
FIG. 4 illustrates another example of a decluttered navigation presentation.

FIG. 4 illustrates another example of a decluttered navigation presentation. This example is illustrated in terms of four operational stages 402-408. This example shows the navigation application dynamically modifying how it generates the decluttered navigation presentation based on the current navigation context. In this example, the navigation presentation displays a representation 422 of the device navigating along a freeway. The first stage 402 shows a traditional 2D navigation presentation 472 that shows the device navigating along the freeway. In this presentation, many roads and structures that are near the route are displayed to give the viewer some context regarding where he is driving. However, such context is often unnecessary when the viewer is driving on a freeway for a long stretch because the viewer will not be getting off the freeway and hence does not need to situate himself with the surroundings.

The first stage 402 shows the user selecting the declutter control 250. The second stage 404 then shows that in response to this selection, the navigation application provides a decluttered navigation presentation 475. In this presentation, many of the roads surrounding the navigated freeway have been removed. In this presentation, even the route representation 418 (that was displayed in the first stage 402) has been removed in favor of an arrow 480. Some embodiments would not even provide this arrow, but instead would draw the navigated freeway with a particular color or highlight (or otherwise differentiate the appearance of the navigated freeway) in order to make the navigated freeway more noticeable than other roads that are not on the navigated route in the navigated presentation.

In the second stage 404, all the roads and structures near the navigated freeway have also been removed as they are not major roads or structures. However, the third stage 406 shows that once the device reaches the intersection with another major freeway 476, the decluttered navigation presentation provides a representation of this intersection. Since the other freeway intersection is a bridge and the other freeway is a major structure, not providing a representation for this freeway might be too disconcerting or distracting even in the decluttered navigation presentation.

The fourth stage 408 illustrates that as the device reaches its destination and has to get off the freeway, the decluttered navigation presentation provides representations 478 and 480 of the roads and structures near the freeway exit. These representations 478 and 480 provide the user with needed context for performing maneuvers along the navigated route. In some embodiments, the decluttered navigation presentation starts to provide representations for nearby roads and structures several exits before the device reaches the desired exit, in order to highlight the need for the upcoming maneuver and to get the viewer better acclimated with his or her surroundings.

Figure 5:
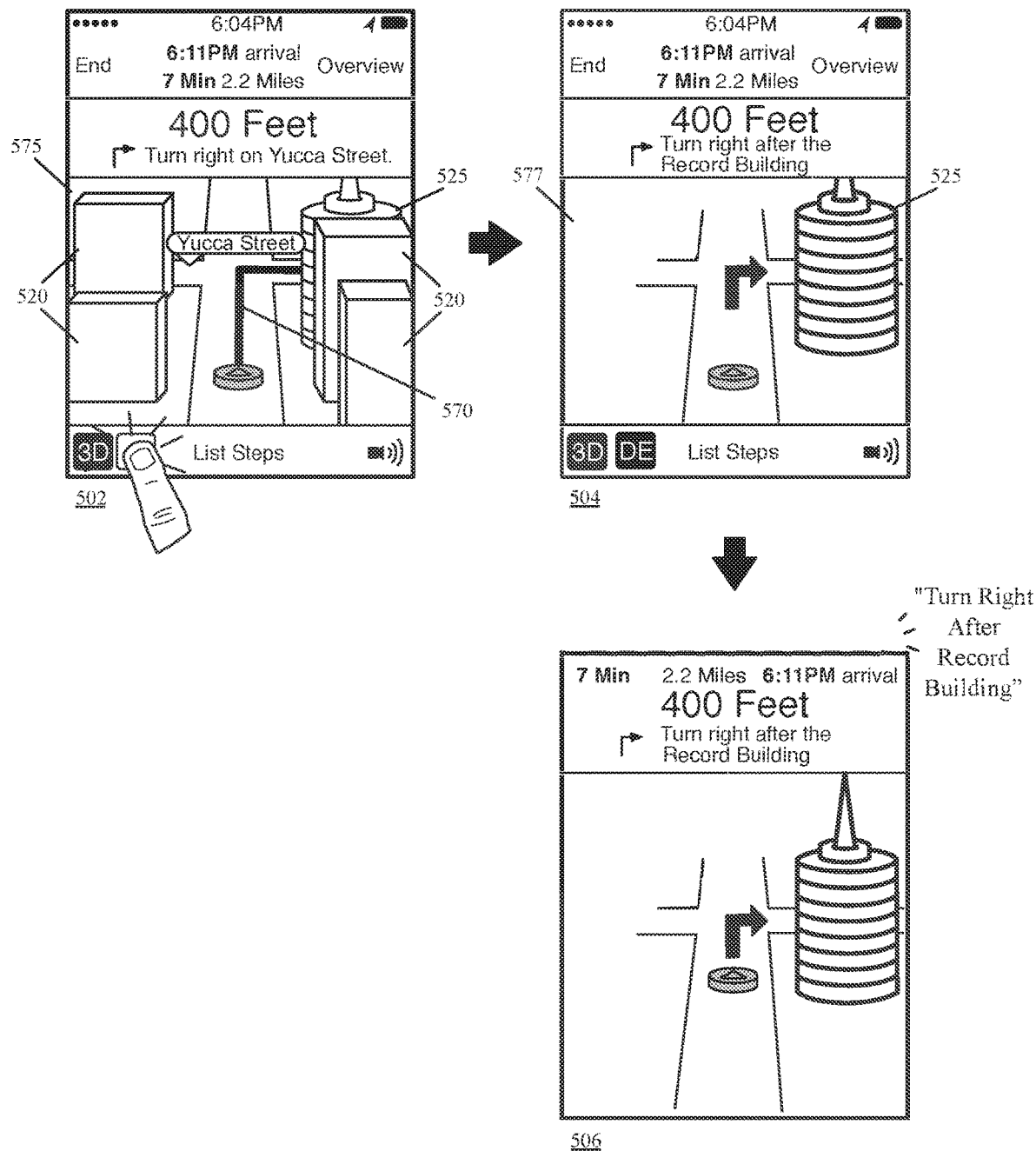
FIG. 5 illustrates an example that show that by showing fewer superfluous objects in the navigated scene, a decluttered presentation can display more significant items.

By showing fewer superfluous objects in the navigated scene, the decluttered presentation can displays more significant items and can provide directions by reference to significant landmarks, which can now be provided more prominently in the navigation presentation. FIG. 5 illustrates an example of such an approach. This approach is illustrated in terms of three operational stages 502-506. The first two stages 502 and 504 show the navigation application switching form a normal 3D navigation presentation 575 to a decluttered 3D navigation presentation 577.

In the decluttered navigation presentation 577, the navigation application removes the representation of the navigated route 570, and in its places inserts an arrow at the juncture for an upcoming maneuver along the route. Also, while removing superfluous buildings 520 that are displayed in the navigated presentation 575 of the first stage 502, the decluttered navigation presentation 577 provides a more pronounced representation of the building 525, because this building is at the maneuver juncture. Also, as shown in the second and third stages 504 and 506, the decluttered presentation 577 provides navigation instructions with respect to this building in its navigation banner and in its voice instruction prompt.

When multiple buildings are at such a juncture and these buildings have the same characteristics, the decluttered presentation in some embodiments highlights the building that has a particular positional relationship with the maneuver, e.g., for a right turn, it is the building on the right at the juncture, or for a left turn, it is the building on the left at the juncture. In some embodiments, the decluttered presentation highlights buildings that are designated in the map data as landmark buildings instead of, or more preferentially, than other buildings. In this example, the building 525 is a landmark building. In some embodiments, the landmarks are identified in an automated manner by analyzing POI designations in the map data, and analyzing building footprint data to identify the size of the buildings.

Figure 6:
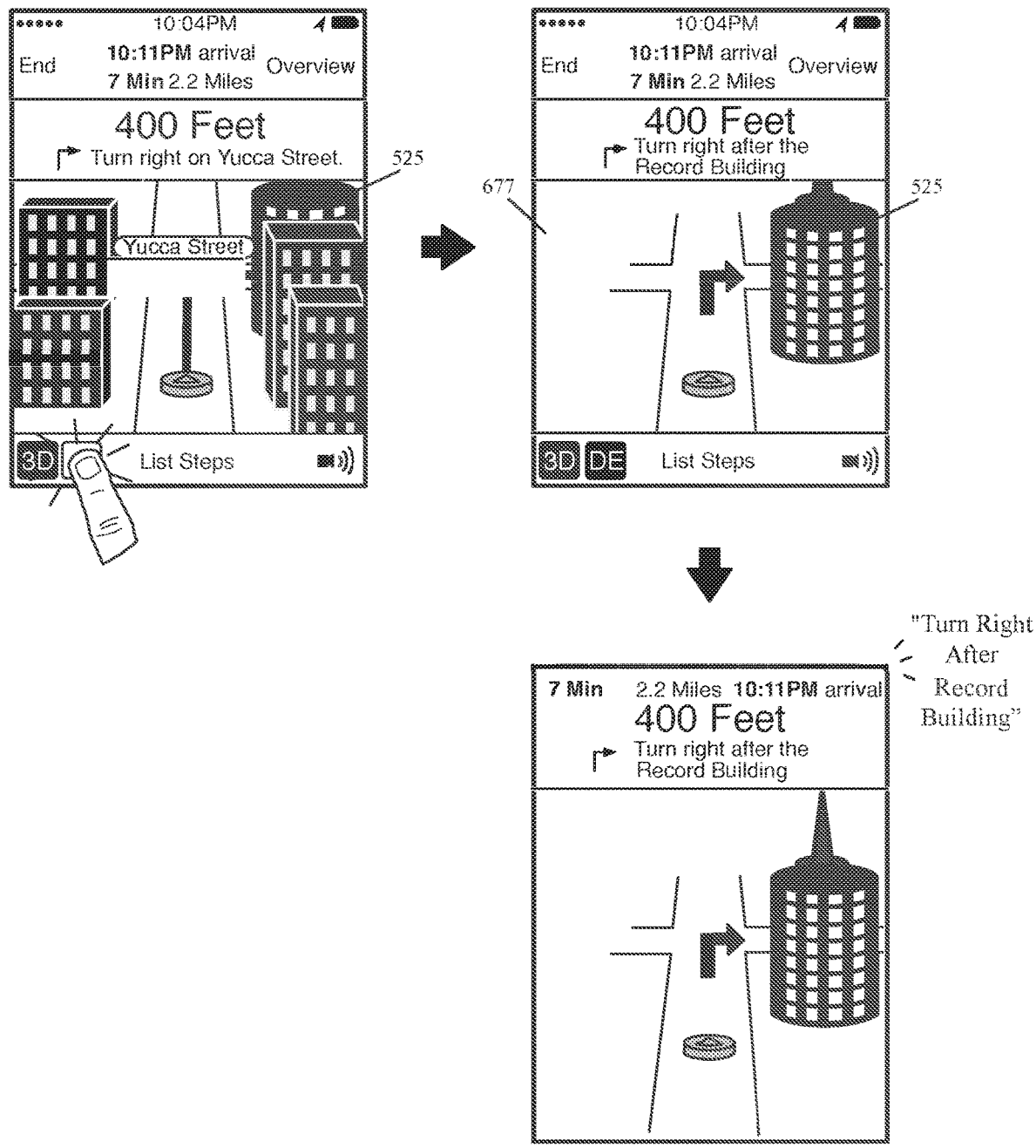
FIG. 6 illustrates that in some embodiments, the navigation presentation has a night-time decluttered mode that presents night-time views of the buildings in the navigated route, in order to highlight these buildings some more.

FIG. 6 illustrates that in some embodiments, the navigation presentation has a night-time decluttered mode that presents night-time views of the buildings in the navigated route, in order to highlight these buildings some more. This example is similar to the example of FIG. 5 except that in FIG. 6, the decluttered presentation 677 displays a night mode navigation presentation. In this presentation, the building 525 is displayed again while the other buildings are removed. In this mode, the representation of building 525 in some embodiments matches how this building would look at night. This representation is derived from data captured by vehicles that drive around to record how roads and buildings look like from a ground point of view at night.

Figure 7:
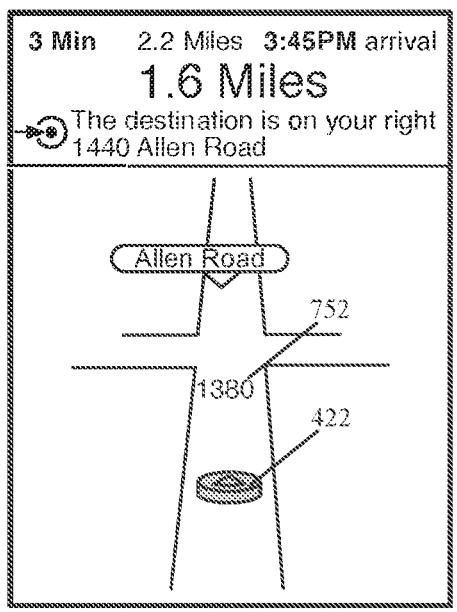
FIG. 7 illustrates that some embodiments highlight building numbers in the decluttered navigation presentation as this presentation displays fewer unnecessary constructs.
Figure 7:
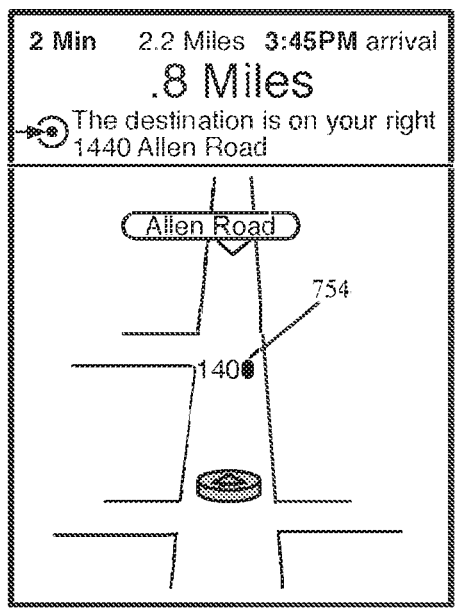
Figure 7:
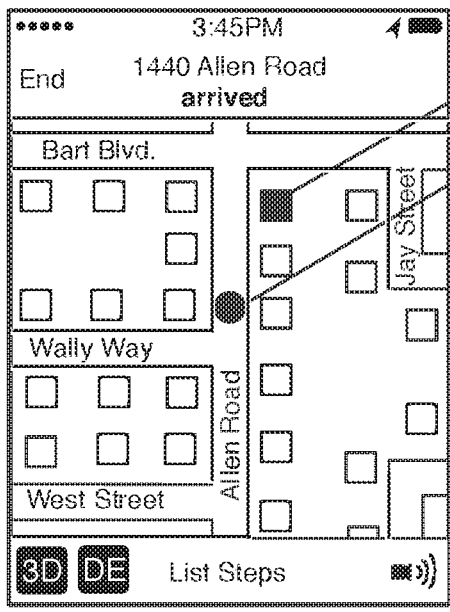
Figure 7:
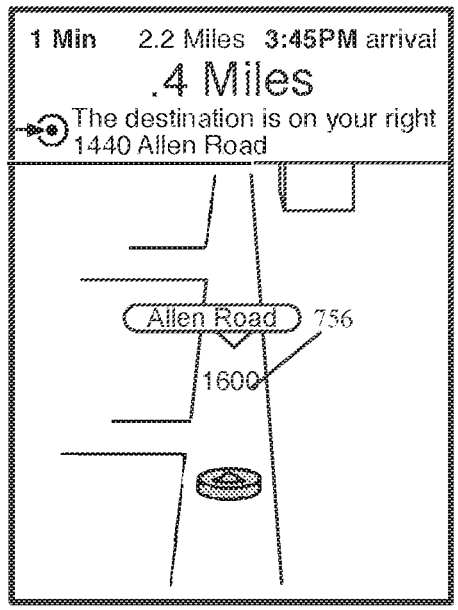

FIG. 7 illustrates that some embodiments highlight building numbers in the decluttered navigation presentation as this presentation displays fewer unnecessary constructs. This example is illustrated in four stages 702-708. The first three stages 702-706 illustrate the building block numbers 752, 754, and 756 displayed on the navigated road's representation as the device nears its destination. When the user is navigating to a particular address, it is very useful to see the building block numbers count towards the destination's address number. This countdown provides the user with the needed context to figure out how far the user is from the destination.

In the example illustrated in FIG. 7, the building numbers are drawn on the navigated road representation. In other embodiments, these building numbers are drawn in different locations and/or drawn differently in the navigated scene. For instance, in some embodiments, the building numbers might be drawn next to the road. In some embodiments, the building numbers might not lie flat on or next to the navigated road, but may appear vertically next to the road. In some embodiments, the navigation application only provides the building number count when the device gets closer to the destination. In other words, once the device is within a threshold distance of the destination, or is on the street of the destination location, the application in some embodiments turns on its building number count The fourth stage 708 also illustrates that in some embodiments the navigation application combines the building number count with an animation that switches from the 3D view to a top-down 2D view, as the device gets close to the destination. The 2D top-down view highlights the location 762 of the device and the location 764 of the destination so that the user can quickly determine that he has reached the destination and his position compared to this destination. Other embodiments do not switch to this top-down animation while providing a building number count. Yet other embodiments use the top-down animation but do not provide the building number count.

Also, some embodiments provide the above-described navigation features in regular navigation presentations. For instance, in some embodiments, the navigation application provides these features even when it does not provide a decluttered navigation presentation. Examples of these features would be the building number count feature, the landmark-direction feature, the night-mode building representations, etc.

Figure 8:
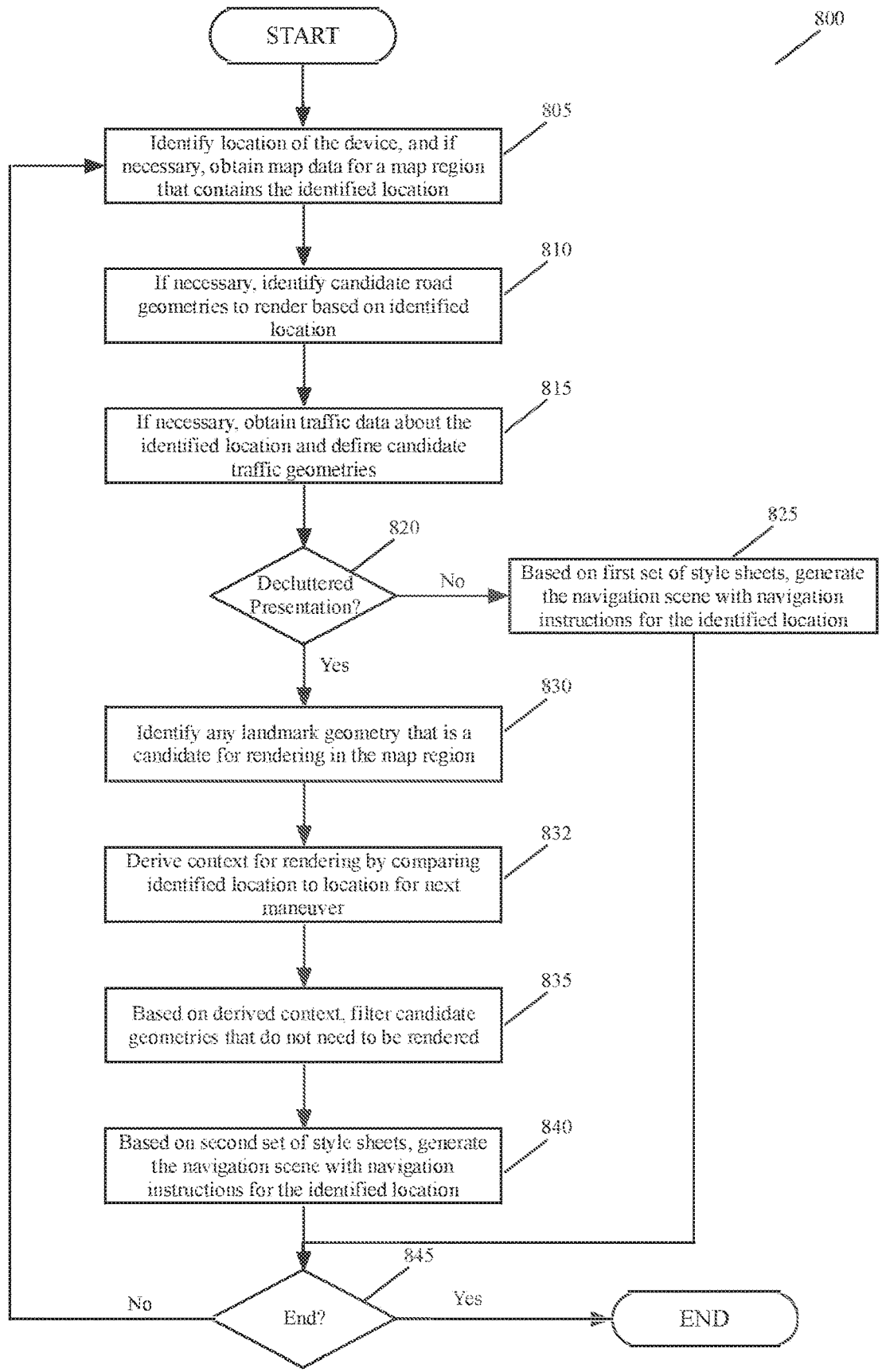
FIG. 8 illustrates a process that a navigation application of some embodiments performs to provide a decluttered navigation presentation.

FIG. 8 illustrates a process 800 that a navigation application of some embodiments performs to provide a decluttered navigation presentation. In some embodiments, this navigation application executes on a mobile device (e.g., smartphone or tablet), while in other embodiments, this application executes on an electronic system of vehicle (e.g., an automobile). As further described below, the navigation application is a style-sheet driven application that generates different types of navigation presentations based on different sets of style sheets, e.g., generates a traditional, first navigation presentation based on a first set of style sheets, while generating a decluttered, second navigation presentation based on a second set of style sheets.

The process initially identifies (at 805) the location of the device (e.g., mobile device, vehicle electronic system, etc.) on which the navigation application executes. In some embodiments, the process identifies this location by using a set of one or more location-identification processes that execute on the device. Examples of such processes include location identification processes that use GPS (global position system) transceivers and/or WiFi transceivers of the device, in order to obtain location data that the location identification processes use to identify the location of the device.

At 805, the process 800 obtains map data for a region that is near and includes (e.g., surrounds) the location identified at 805, if the process has not previously obtains such map data. This map data is obtained to rendered either a detailed or decluttered navigation scene that is based on the location identified at 805. In some embodiments, this navigation scene is a 3D perspective view of the map that is rendered from a particular position of a virtual camera. In some embodiments, the camera's position is dependent on the identified location, as the camera tracks the position of the device (e.g., keeps the device's position at a particular location in the scene) as the device traverses along the navigated route.

In some embodiments, the navigation application is a tile-based application that downloads map data that is organized into different tiles for different regions and/or different zoom levels. Accordingly, in these embodiments, the process determines (at 805) whether it needs to download the tile data for the region that contains the identified region, and if so, downloads one or more map tiles for this region from a set of one or more map servers. In some of these embodiments, the navigation application communicates with the map server set through a wireless communication network (e.g., mobile data network, such a 4G or 5G network). When the process determines (at 805) that it has previously obtained the map data for the region containing the identified location, it does not re-download this data from the map server set.

Next, from the obtained map data, the process identifies (at 810) the geometry data of the roads that are candidates for rendering based on the location identified at 805. During the navigation presentation, the process 800 iterates through 805-845 multiple times. When the device's location has not changed since the process's last iteration through 810, the process does not need to re-identify the road geometry data, as the road geometry data identified in the last iteration through 810 is still valid. Even when the device's location has changed since the last iteration, the process might not need to re-identify the road geometry data when in the prior iterations the process identified more road geometry data than it needed for the navigated scene.

The road geometry data identified at 810 defines the road geometries that are candidates for displaying in the navigation presentation. However, not all of the identified road geometries will be rendered in the navigation presentation. As further described below, the process 800 in some embodiments renders the road geometries for display based on the rending rules that are defined in the style sheet that the process uses to generate the navigation presentation.

After 810, the process identifies (at 815) traffic data about the identified location. In some embodiments, this traffic data includes traffic congestion data, road condition data (e.g., weather data, road construction data), accident data, etc. In some embodiments, the navigation application communicates with a set of one or more traffic servers through a wireless communication network (e.g., mobile data network, such a 4G or 5G network) to obtain traffic data. The traffic server set in some embodiments is the same as the map server set that provides the tile data, while in other embodiments it is a different set of servers.

When the device's location has not changed since the process' last iteration through 815, the process does not always obtain new traffic data, as the traffic data identified in the last iteration through 815 might still be valid. However, when the device's location data does not change for a particular duration of time, the process in some embodiments obtains new traffic data as the traffic data might have changed.

The navigation application of some embodiments displays traffic conditions by rendering traffic-related objects (e.g., traffic congestion lines, traffic accident icons, etc.) like other map geometry objects that it renders in the navigated scene of the navigation presentation. Accordingly, based on the identified traffic data, the process defines (at 815) traffic-related objects that are candidate objects to render for the location identified at 805. However, not all of the identified traffic geometries will be rendered in the navigation presentation. As further described below, the process 800 in some embodiments renders the traffic geometries for display based on the rending rules that are defined in the style sheet that the process uses to generate the navigation presentation.

Next, at 820, the process determines whether the user has requested a decluttered navigation presentation. In some embodiments, the default navigation presentation mode is the traditional detailed navigation presentation mode, and the user has to select the decluttered navigation presentation mode (e.g., through selecting the decluttered navigation control 250). In other embodiments, the decluttered navigation presentation is the default mode, and the user has to selected the traditional, detailed navigation presentation. The user can switch between the traditional, detailed navigation presentation and the decluttered navigation presentation (e.g., by toggling the declutter navigation control 250), and the process will effectuate this switch at 820 in some embodiments.

When the process determines (at 820) that it should generate a traditional, detailed navigation presentation, it transitions to 825, where it generates a detailed navigation scene by using a first set of style sheets. In some embodiments, this set of style sheets has several rules that define how the process should render (1) the roads traversed by the navigated route, (2) the roads intersecting the roads traversed by the navigated route, (3) the roads near the navigated route but not intersected by the navigated route, (4) buildings and other natural or man-built objects near the navigated route, (5) the navigated route, (6) the object (e.g., puck) representing the navigating objet, etc, and (7) navigation banners. These rules of the first set of style sheets not only specify how these objects should be rendered, but also specify which of the nearby objects (e.g., which of the nearby roads and/or buildings) should be rendered. After 825, the process transitions to 845, which will be described below.

When the process determines (at 820) that it should not generate a traditional, detailed navigation presentation, the process performs operations 830-840 to generate a decluttered navigation presentation of the navigation scene. In some embodiments, this navigation scene is the same navigation scene for which the traditional, detailed navigation scene would be generated at 825 (e.g., it is for the same perspective 3D view of the map based on the same virtual camera position), but the scene in the decluttered presentation includes fewer rendered objects than it does in the traditional, detailed presentation.

At 830, the process identifies in the identified map data the geometries of all landmarks that are candidates for rendering in the navigated scene (i.e., in the map region containing the identified location). Next, at 832, the process identifies a context for rendering the navigated scene. In some embodiments, the process identifies this context by comparing the current identified location with the location of the next maneuver in the navigated route. This is because the process does not render nearby objects (e.g., nearby non-intersecting roads, nearby landmarks that are not at or near a maneuver in the navigated route, etc.) that are not pertinent to a navigation maneuver during the declutter navigation presentation of some embodiments. This approach allows the process to forego rendering roads near a navigated freeway route until the device reaches a nearby exist, as described above by reference to FIG. 4. It also allows the process to forego landmarks near a navigated route unless the landmark is near a maneuver juncture along the navigated route, as described above by reference to FIGS. 5 and 6.

At 835, the process filters (i.e., discards) the identified candidate geometries (e.g., geometries for roads, landmarks, traffic, etc.) that it should not render in the navigated scene based on the derived rendering context (identified at 832) and the rendering rules that are contained in a second set of style sheets that the process uses for generating the decluttered navigation presentation. Next, at 840, the process renders a decluttered navigated scene based on the candidate geometries that remain after the filtering (i.e., based on the identified candidate geometries (e.g., geometries for roads, landmarks, traffic, etc.) that were not discarded at 835. The process generates (at 840) the decluttered navigation scene by using the second set of style sheets. In some embodiments, this set of style sheets has several rules that define how the process should render (1) the roads traversed by the navigated route, (2) the roads intersecting the roads traversed by the navigated route, (3) buildings and other natural or man-built objects near the navigated route, (4) the object (e.g., puck) representing the navigating objet, etc., and (5) navigation banners. These rules of the second set of style sheets not only specify how these objects should be render, but also specify which of the nearby objects (e.g., which of the nearby landmarks) should be rendered. After 840, the process transitions to 845.

At 845, the process determines whether it should terminate the navigation presentation. The process terminates the navigation presentation when the device reaches it destination. It also terminates the navigation presentation when the user directs it to terminate the presentation. When the process determines (at 845) that it should terminate the presentation, it ends. Otherwise, it returns to 805, in order to repeat its operations to continue the navigation presentation.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
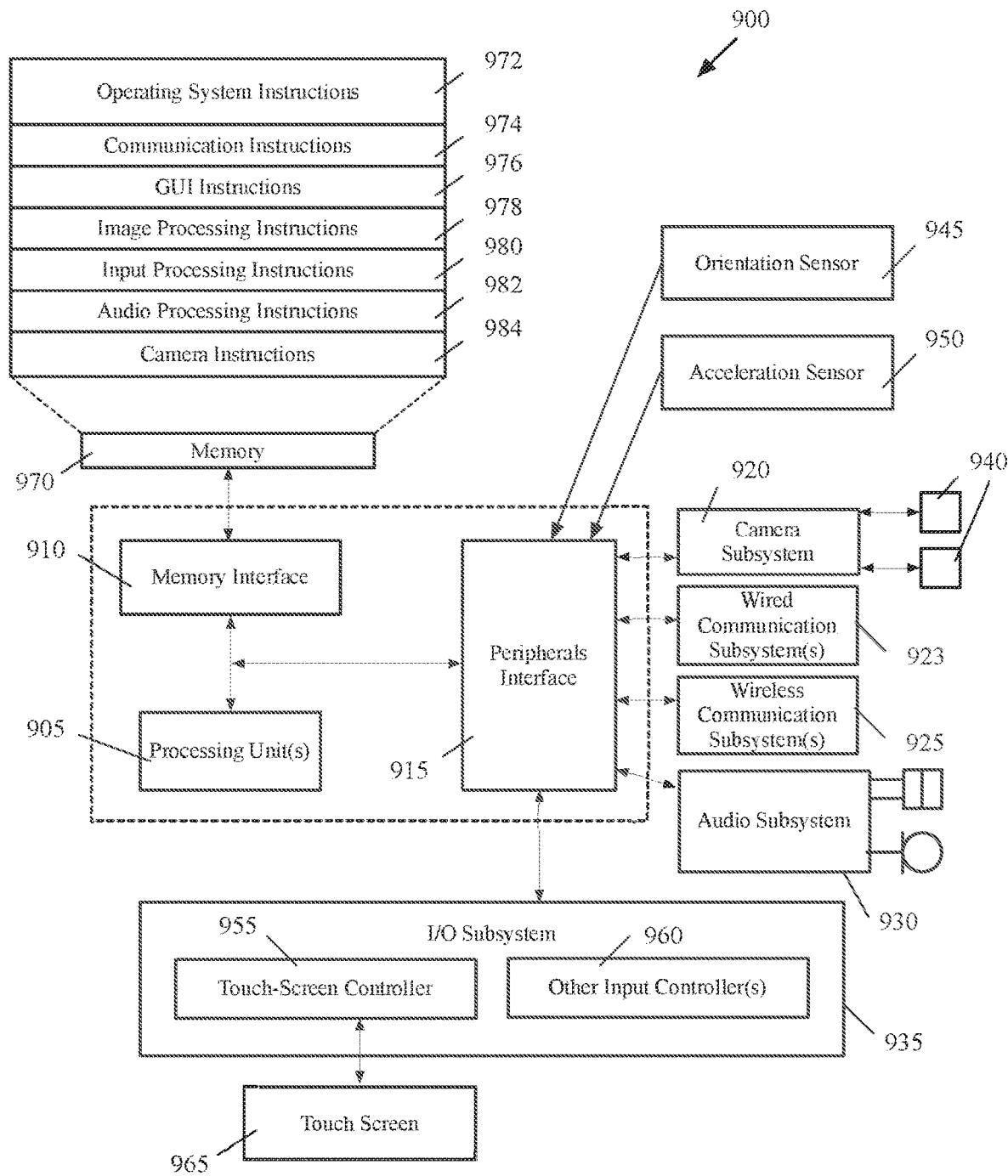
FIG. 9 is an example of an architecture of such a mobile computing device.

The applications of some embodiments operate on mobile devices, such as smart phones (e.g., iPhones®) and tablets (e.g., iPads®). FIG. 9 is an example of an architecture 900 of such a mobile computing device. Examples of mobile computing devices include smartphones, tablets, laptops, etc. As shown, the mobile computing device 900 includes one or more processing units 905, a memory interface 910 and a peripherals interface 915.

The peripherals interface 915 is coupled to various sensors and subsystems, including a camera subsystem 920, a wireless communication subsystem(s) 925, an audio subsystem 930, an I/O subsystem 935, etc. The peripherals interface 915 enables communication between the processing units 905 and various peripherals. For example, an orientation sensor 945 (e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wireless communication subsystem 925 serves to facilitate communication functions. In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions, such as voice recognition (e.g., for searching), digital recording, etc.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions. Also, the input controller of some embodiments allows input through a stylus.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 972. The OS 972 includes instructions for handling basic system services and for performing hardware dependent tasks.

The memory 970 also includes communication instructions 974 to facilitate communicating with one or more additional devices; graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

Figure 10:
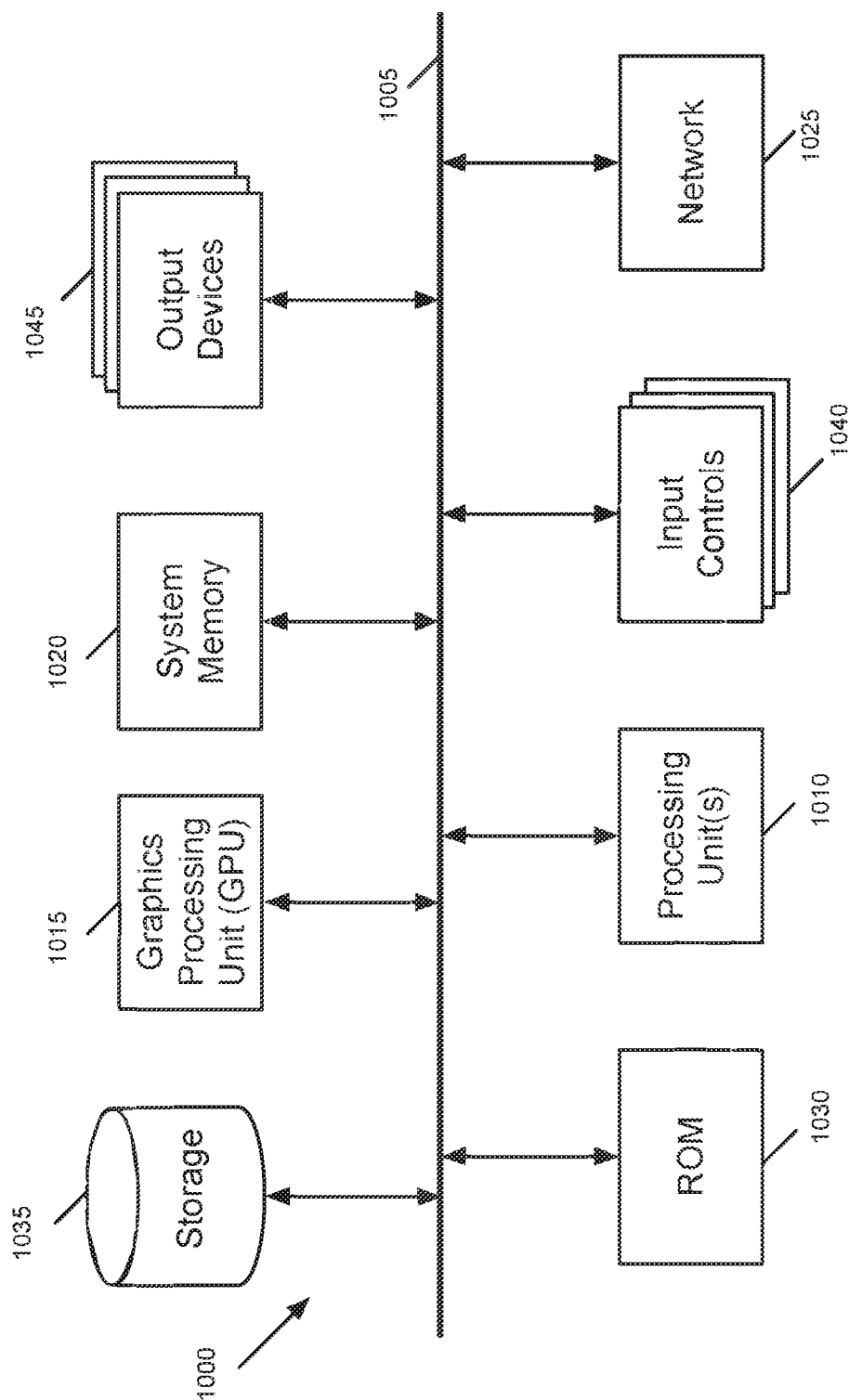
FIG. 10 conceptually illustrates another example of an electronic system with which some embodiments of the invention are implemented.

FIG. 10 conceptually illustrates another example of an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive, integrated flash memory) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called cursor control devices (e.g., mice)), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet), or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method of providing a navigation presentation, the method being implemented by a device navigating a route to a destination, the method comprising:
   presenting a navigation presentation of the route;
   identifying a map object that is within a first threshold distance of a maneuver juncture for an upcoming maneuver along the route, wherein the map object comprises a point of interest;
   presenting the point of interest with a particular representation that is based on a distance between the point of interest and maneuver juncture,
      wherein the particular representation comprises a first representation when the point of interest is within a second threshold distance of the maneuver juncture, wherein the particular representation comprises a second representation when the point of interest is not within the second threshold distance of the maneuver juncture, and
      wherein the first representation is more emphasized relative to the second representation;
   identifying a positional relationship between the upcoming maneuver and the point of interest; and
   based on the identified positional relationship, presenting a maneuver instruction for the upcoming maneuver relative to the point of interest on the navigation presentation.

2. The method of claim 1, further comprising:
   based on the identified positional relationship, generating the maneuver instruction, wherein the maneuver instruction provides an instruction to maneuver at the maneuver juncture with reference to the map object.

3. The method of claim 1, wherein the point of interest includes one or more of a building or a geographic landmark.

4. The method of claim 1, wherein the map object is one of a natural object or a human-built object.

5. The method of claim 1, further comprising:
   identifying at least one other map object that is not within a threshold distance of the maneuver juncture; and
   refraining from presenting the at least one other map object on the navigation presentation.

6. The method of claim 1, further comprising:
   analyzing map data for one or more attributes of the map object;
   determining that at least one attribute of the one or more attributes corresponds to a landmark designation for the map object; and
   based on the determination, presenting the maneuver instruction for the upcoming maneuver relative to the map object on the navigation presentation.

7. The method of claim 1, further comprising:
   analyzing map data to identify at least one map object that has a particular point of interest designation;
   determining that the at least one map object and at least one other map object lies along the route, wherein the at least one other map object lacks the particular point of interest designation; and
   based on the determination, presenting the at least one map object in the maneuver instruction and refraining from presenting the at least one other map object in the maneuver instruction.

8. The method of claim 1, further comprising:
   fading roads that are not located on the route, wherein minor roads not on the route are faded quicker than major roads not on the route.

9. The method of claim 1, further comprising including the maneuver instruction in a voice instruction prompt, wherein the voice instruction prompt includes an identifier of the map object.

10. The method of claim 1, further comprising:
    presenting a detailed navigation presentation of the route, the detailed navigation presentation including a first maneuver instruction that includes a reference to a road corresponding to the maneuver juncture;
    receiving user input selecting a decluttered navigation presentation; and
    responsive to the user input, replacing the first maneuver instruction with a second maneuver instruction that includes a reference to the map object.

11. The method of claim 1, further comprising:
    displaying building numbers along the route responsive to the device being within a third threshold distance of the destination.

12. A non-transitory machine readable medium storing a program for providing a navigation presentation, the program being executed by a device navigating a route to a destination, the program comprising sets of instructions for:
- presenting a navigation presentation of the route;
- identifying a map object that is within a first threshold distance of a maneuver juncture for an upcoming maneuver along the route, wherein the map object comprises a point of interest;
- presenting the point of interest with a particular representation that is based on a distance between the point of interest and maneuver juncture,
  - wherein the particular representation comprises a first representation when the point of interest is within a second threshold distance of the maneuver juncture,
  - wherein the particular representation comprises a second representation when the point of interest is not within the second threshold distance of the maneuver juncture, and
  - wherein the first representation is more emphasized relative to the second representation;
- identifying a positional relationship between the upcoming maneuver and the point of interest; and
- based on the identified positional relationship, presenting a maneuver instruction for the upcoming maneuver relative to the point of interest on the navigation presentation.

13. The non-transitory machine readable medium of claim 12, wherein the point of interest includes one or more of a building or a geographic landmark.

14. The non-transitory machine readable medium of claim 12, wherein the program further comprises sets of instructions for:
- identifying at least one other map object that is not within a threshold distance of the maneuver juncture; and
- refraining from presenting the at least one other map object on the navigation presentation.

15. The non-transitory machine readable medium of claim 12, wherein the program further comprises sets of instructions for:
- analyzing map data for one or more attributes of the map object;
- determining that at least one attribute of the one or more attributes corresponds to a landmark designation for the map object; and
- based on the determination, presenting the maneuver instruction for the upcoming maneuver relative to the map object on the navigation presentation.

16. The non-transitory machine readable medium of claim 12, wherein the program further comprises sets of instructions for including the maneuver instruction in a voice instruction prompt, wherein the voice instruction prompt includes an identifier of the map object.

17. The non-transitory machine readable medium of claim 12, wherein the program further comprises sets of instructions for:
- presenting a detailed navigation presentation of the route, the detailed navigation presentation including a first maneuver instruction that includes a reference to a road corresponding to the maneuver juncture;
- receiving user input selecting a decluttered navigation presentation; and
- responsive to the user input, replacing the first maneuver instruction with a second maneuver instruction that includes a reference to the map object.

18. A mobile device comprising:
- a display screen;
- a processor; and
- a non-transitory computer readable medium storing a mapping application program comprising instructions that are executable by the processor, the program comprising instructions for:
  - presenting, on the display screen, a navigation presentation of the route;
  - identifying a map object that is within a first threshold distance of a maneuver juncture for an upcoming maneuver along the route, wherein the map object comprises a point of interest;
  - presenting the point of interest with a particular representation that is based on a distance between the point of interest and maneuver juncture,
    - wherein the particular representation comprises a first representation when the point of interest is within a second threshold distance of the maneuver juncture,
    - wherein the particular representation comprises a second representation when the point of interest is not within the second threshold distance of the maneuver juncture, and
    - wherein the first representation is more emphasized relative to the second representation;
  - identifying a positional relationship between the upcoming maneuver and the point of interest; and
  - based on the identified positional relationship, presenting a maneuver instruction for the upcoming maneuver relative to the point of interest on the navigation presentation.

19. The mobile device of claim 18, wherein the program further comprises instructions for:
- analyzing map data for one or more attributes of the map object;
- determining that at least one attribute of the one or more attributes corresponds to a landmark designation for the map object; and
- based on the determination, presenting the maneuver instruction for the upcoming maneuver relative to the map object on the navigation presentation.

20. The mobile device of claim 18, wherein the program further comprises instructions for:
- including the maneuver instruction in a voice instruction prompt, wherein the voice instruction prompt includes an identifier of the map object.

21. The mobile device of claim 18, wherein the program further comprises instructions for:
- presenting a detailed navigation presentation of the route, the detailed navigation presentation including a first maneuver instruction that includes a reference to a road corresponding to the maneuver juncture;
- receiving user input selecting a decluttered navigation presentation; and
- responsive to the user input, replacing the first maneuver instruction with a second maneuver instruction that includes a reference to the map object.

* * * * *